United States Patent
Jang

(10) Patent No.: US 7,966,049 B2
(45) Date of Patent: Jun. 21, 2011

(54) SLIDE MODULE AND MOBILE TERMINAL HAVING THE SAME

(75) Inventor: Chang-Yong Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 785 days.

(21) Appl. No.: 11/951,264

(22) Filed: Dec. 5, 2007

(65) Prior Publication Data
US 2008/0131196 A1   Jun. 5, 2008

(30) Foreign Application Priority Data
Dec. 5, 2006   (KR) .................. 10-2006-0122326

(51) Int. Cl.
H04M 1/00   (2006.01)
(52) U.S. Cl. .................. 455/575.4; 455/575.1; 455/90.3
(58) Field of Classification Search ............... 455/575.4, 455/575.1, 90.3, 575.8; 403/166, 331
See application file for complete search history.

(56) References Cited

U.S. PATENT DOCUMENTS

| 2002/0172154 A1 | 11/2002 | Uchida et al. | |
|---|---|---|---|
| 2006/0046796 A1 | 3/2006 | Park et al. | |
| 2007/0155451 A1* | 7/2007 | Lee | 455/575.4 |
| 2008/0058039 A1* | 3/2008 | Lee et al. | 455/575.4 |
| 2008/0254844 A1* | 10/2008 | Lee | 455/575.4 |

FOREIGN PATENT DOCUMENTS

| JP | 2000-224136 | 8/2000 |
|---|---|---|
| KR | 10-2006-0009737 | 2/2006 |
| WO | WO 02-01849 | 1/2002 |
| WO | 2006/006776 | 1/2006 |
| WO | 2006/031078 | 3/2006 |
| WO | 2006/098590 | 9/2006 |
| WO | 2007/037596 | 4/2007 |

* cited by examiner

Primary Examiner — John Lee
(74) Attorney, Agent, or Firm — Lee, Hong, Degerman, Kang & Waimey

(57) ABSTRACT

A slide module includes a first slide member configured to slide upwardly and downwardly, a second slide member slidably mounted to the first slide member, and an elastic force unit disposed between the first slide member and the second slide member, and having an elastic member mounted between a first rod and a support member, and between a second rod and the support member, wherein an elastic force is generated when the first slide member is slid upwardly and downwardly with respect to the second slide member.

22 Claims, 4 Drawing Sheets

SLIDE MODULE AND MOBILE TERMINAL HAVING THE SAME

CROSS-REFERENCE TO RELATED APPLICATIONS

Pursuant to 35 U.S.C. §119(a), this non-provisional patent application claims the benefit of the earlier filing date and right of priority of Patent Application No. 10-2006-0122326 filed in Republic of Korea on Dec. 5, 2006, the entire contents of which are hereby incorporated by reference.

FIELD OF THE INVENTION

The present invention relates to a mobile terminal, and more particularly, to a slide module providing an elastic force when a first body is relatively slid upwardly and downwardly relative to a second body.

DESCRIPTION OF RELATED ART

Generally, a slide module is mounted at a slide type mobile terminal to slidably support a first body and a second body attached to each other.

The slide module includes a first slide member fixed at a rear surface of the first body, a second slide member fixed at a front surface of the second body and slidably mounted on the first slide member, and an elastic force providing unit installed between the first slide member and the second slide member for providing an elastic force for the first slide member to be automatically slid when the first slide member is slid upwardly or downwardly relative to the second slide member.

The elastic force unit currently used has problems, such as slide module durability, preventing loosening as a result of long-time usage of the mobile terminal, reliability, and minimizing the size and thickness thereof as mobile terminals are gradually fabricated to be more compact.

SUMMARY OF THE INVENTION

In one general aspect of the present invention, a slide module includes a first slide member configured to slide upwardly and downwardly, a second slide member slidably mounted to the first slide member, and an elastic force unit disposed between the first slide member and the second slide member, and having an elastic member mounted between a first rod and a support member, and between a second rod and the support member, wherein an elastic force is generated when the first slide member is slid upwardly and downwardly with respect to the second slide member.

It is contemplated that wherein the first rod is slidably mounted at one side of the support member and has an end rotatably connected to the first slide member, and the second rod is slidably mounted at the other side of the support member and has an end rotatably connected to the second slide member.

In a second general aspect of the present invention, a mobile terminal includes a first body having a display, a second body coupled with the first body, and a slide module disposed between the first body and the second body, wherein the slide module is configured to generate elastically biased movement of the first body in an upward direction and a downward direction with respect to the second body.

It is contemplated that the slide module further includes a first slide member configured to slide upwardly and downwardly, a second slide member slidably mounted to the first slide member, and an elastic force unit disposed between the first slide member and the second slide member, wherein the elastic force unit includes a plurality of elastic members mounted between a first rod and a support member, and between a second rod and the support member.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiment of the invention and together with the description serve to explain the principles of the invention.

DETAILED DESCRIPTION OF PREFERRED EMBODIMENTS

Reference will now be made in detail to the preferred embodiments of the present invention, examples of which are illustrated in the accompanying drawings.

Figure 1:
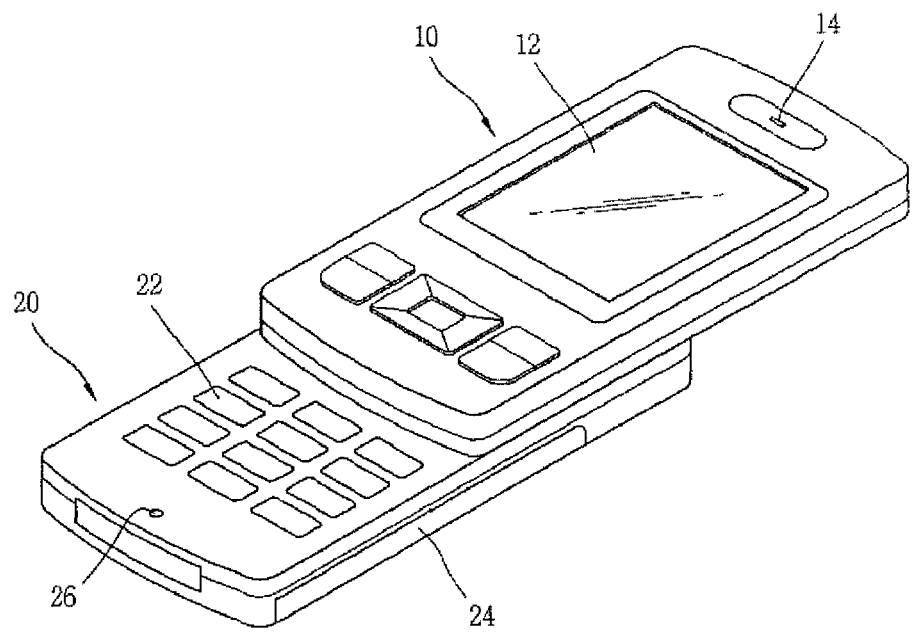
FIG. 1 is a perspective view of a mobile terminal in accordance with an embodiment of the present invention.
Figure 2:
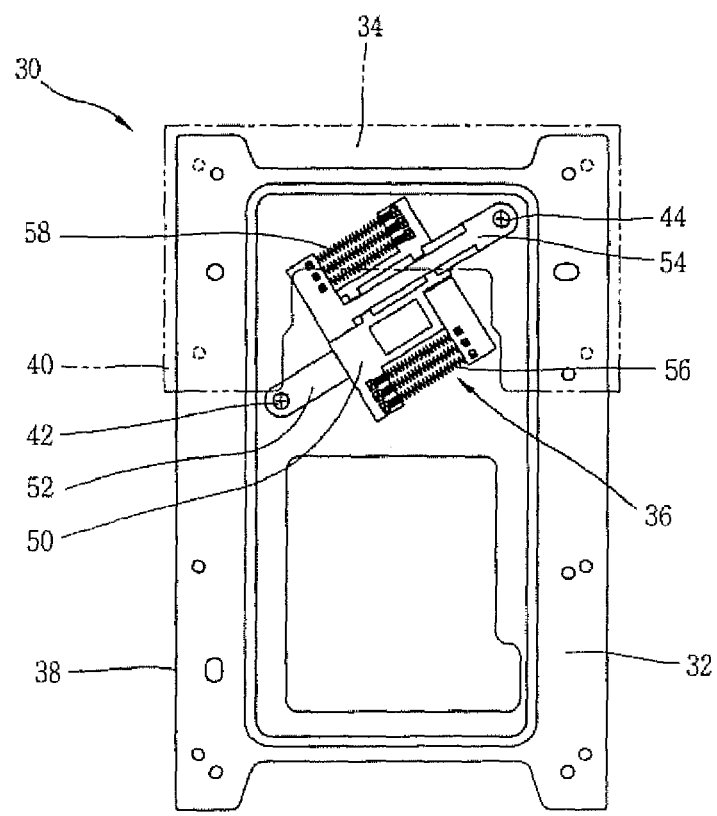
FIG. 2 is a plan view of a slide module in accordance with the embodiment of the present invention.
Figure 3:
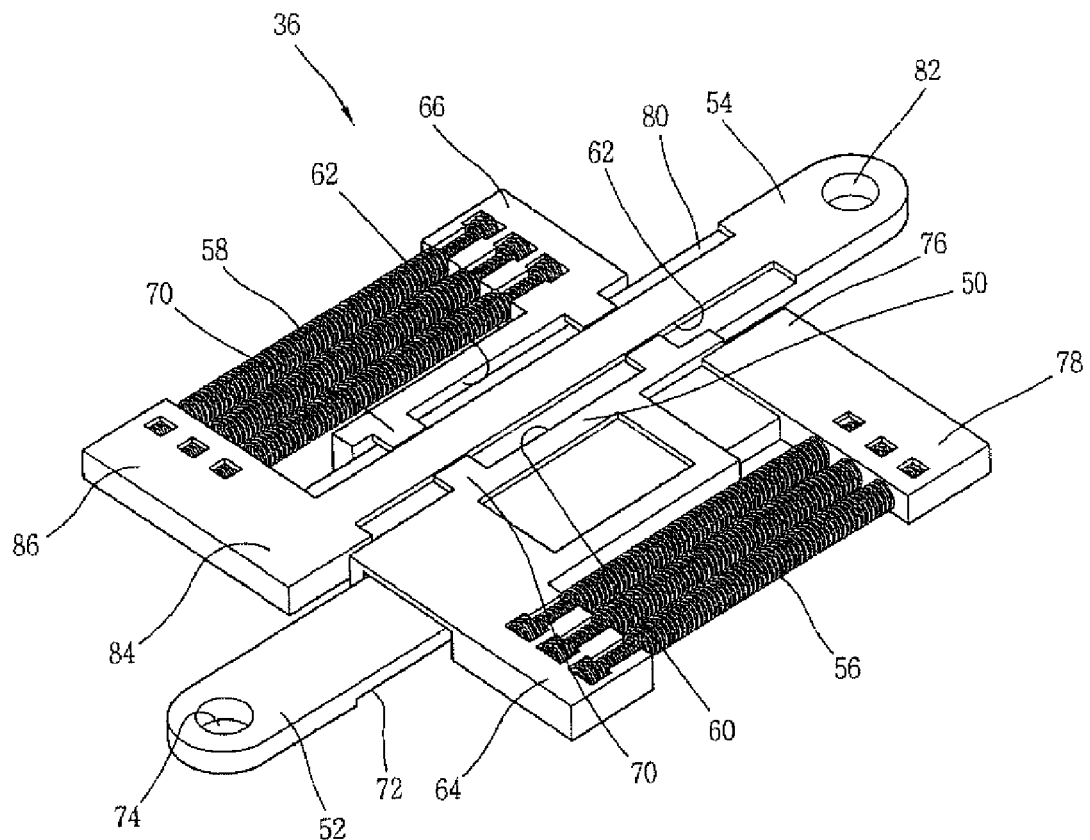
FIG. 3 is a perspective view of an elastic force unit in accordance with the embodiment of the present invention.

FIG. 1 is a perspective view of a mobile terminal in accordance with an embodiment of the present invention, FIG. 2 is a plan view of a slide module in accordance with the embodiment of the present invention, and FIG. 3 is a perspective view of an elastic force providing unit in accordance with the embodiment of the present invention.

The mobile terminal in accordance with the present invention may include a first body 10 provided with a display 12 for displaying information, a second body 20 slidably connected to the first body 10 and provided for mounting an input device 22 for inputting information and a battery 24 for supplying power, and a slide module 30 installed at the first body 10 and the second body 20 for guiding the first body 10 to slide relative to the second body 20.

A speaker 14 outputting sound may be installed at the first body 10, and a microphone 26 for inputting sound may be installed at the second body 20.

The slide module 30 may include a first slide member 32 fixed at a lower surface of the first body 10, a second slide member 34 slidably mounted to the first slide member 32 and fixed at an upper surface of the second body 20, and an elastic force unit 36 installed between the first slide member 32 and the second slide member 34. The elastic force unit 36 provides an elastic force movement when the first slide member 32 is slid upwardly or downwardly, allowing the first slide member 32 to be automatically slid.

The first slide member 32 formed in a plate shape may be coupled to the lower surface of the first body 10 by a bolt and provided with a guide rail 38 at both edges. The second slide member 34 formed in the plate shape may be coupled to the upper surface of the second body 20 by the bolt and provided with a guide groove 40 in which a guide rail 38 is inserted to be slid along the guide rail 38.

As illustrated in FIG. 3, the elastic force unit 36 may include a support member 50, a first rod 52 slidably mounted at one side of the support member 50 and having an end rotatably connected to the first slide member 32, a second rod 54 slidably mounted at the other side of the support member 50 and having an end rotatably supported by the second slide member 34. A first elastic member 56 may be mounted between the first rod 52 and the support member 50 for generating an elastic force, and a second elastic member 58 may be mounted between the second rod 54 and the support member 50 for generating the elastic force.

The support member 50 may include a first rail groove portion 60 slidably supporting the first rod 52, a second rail groove portion 62 disposed in parallel with the first rail groove portion 60 and slidably supporting the second rod 54, a first elastic member mounting portion 64 extended from the lateral surface of the first rail groove 60 for fixing one end of the first elastic member 56, and a second elastic member mounting portion 66 extended from the lateral surface of the second rail groove 62 for fixing one end of the second elastic member 58.

Stopping jaws 70 prevent the first rod 52 and the second rod 54 from being separated, and may be inwardly protruded at the first rail groove portion 60 and the second rail groove portion 62. When the first rail groove portion 60 is provided at a front surface of the support member 50, the second rail groove portion 62 may be provided at a rear surface of the support member 50. Specifically, the first rail groove portion 60 may be provided at one surface and the second rail groove portion 62 may be provided at the other surface of the support member 50 for reinforcement, thereby preventing the support member 50 from being distorted.

A guide rail portion 72 may be configured with a step formed at both edges of the first rod 52 to be slidably stopped by the stopping jaw 70 provided at the first rail groove portion 60. A hinge hole 74 rotatably supported by a hinge pin 42 at the first slide member 32 (see FIG. 6) may be provided at one end of the first rod 52, and a stopper portion 76 may be provided at the other end of the first rod 52. The stopper portion 76 has a thickness that stops movement and prevents separation at one end of the support member 50.

A third elastic member mounting portion 78, configured for attaching three elastic members, may be provided as an extension from the stopper portion 76 in a width direction for mounting the other end of the first elastic member 56. Those skilled in the are will appreciate that the elastic member mounting portion 78 is not limited to three elastic members.

The second rod 54 may also be provided with a guide rail portion 72 formed with a step at both edges of the second rod 54 to be slidably stopped by the stopping jaw 70, and have one end provided with a hinge hole 82 rotatably mounted at the second slide member 34 by a hinge pin 44 (see FIG. 6) and the other end provided with a stopper portion 84 formed with a thickness sufficient to stop movement and prevent being separated at the other end of the support member 50.

A fourth elastic member mounting portion 86 may be formed as an extension from the stopper portion 84 in the width direction for mounting the other end of the second elastic member 58.

Preferably, the elastic members 56 and 58 may be formed of tension coil springs having one end respectively fixed at the elastic member mounting portions 64 and 66, provided at the support member 50, and the other end respectively fixed at the elastic member mounting portions 78 and 86 provided at the first rod 52 and the second rod 54.

Figure 4:
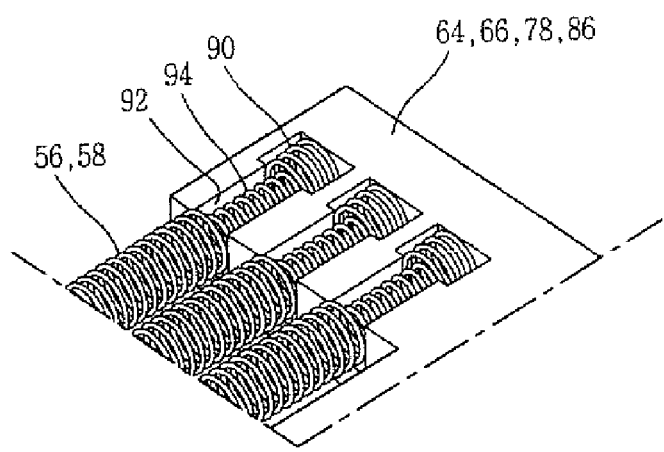
FIG. 4 is a partial perspective view illustrating an elastic member mounting portion in accordance with one aspect of the present invention.

As illustrated in FIG. 4, the elastic member mounting portions 64, 66, 78 and 86, may include insertion recesses 90 provided at the support member 50, the first rod 52 and the second rod 54, respectively, into which ends of the elastic members 56 and 58 are inserted, and stopping portions 92 inwardly protruded at a central portion of the insertion recess 90 for a diameter reduction portion 94 having a diameter which becomes narrow at both ends into which the elastic members 56 and 58 are inserted and stopped.

When both ends of the coil springs 56 and 58 are inserted into the insertion recesses 90, respectively, the diameter reduction portion 94 formed at both ends of the elastic members 56 and 58 may be inserted into the stopping portion 92. Accordingly, both ends of the elastic members 56 and 58 may be fixed at the support member 50 and the rods 52 and 54, respectively.

Figure 5:
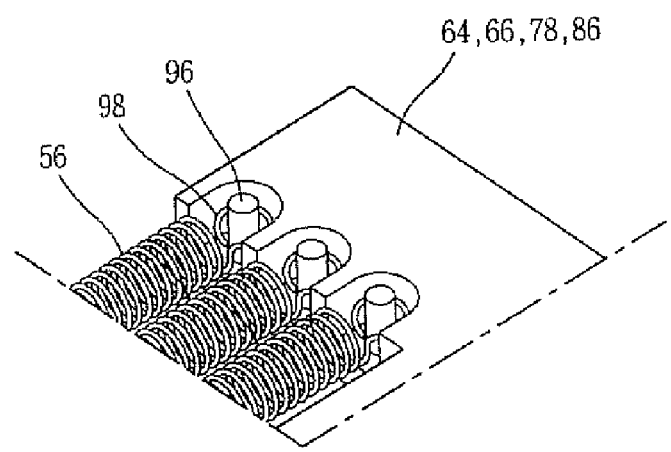
FIG. 5 is a partial perspective view illustrating another aspect of an elastic member mounting portion in accordance with the present invention.

In another embodiment, as illustrated in FIG. 5, the elastic member mounting portions 64, 66, 78, and 86 may include connection pins 96 protruding from a lateral surface of a link rod (not shown) in a thickness and direction for inserting connection rings 98 protruded in a cylindrical shape and provided at both ends of the elastic members 56 and 58.

In the elastic member mounting portions 64, 66, 78, and 86, in accordance with another embodiment of the present invention, the connection pins 96 formed at the support member 50 and the first and second rods 52 and 54 may be wound with the connection rings 98 provided at ends of the elastic members 56 and 58. Accordingly, both ends of the elastic members 56 and 58 may be rotatably supported.

Figure 6:
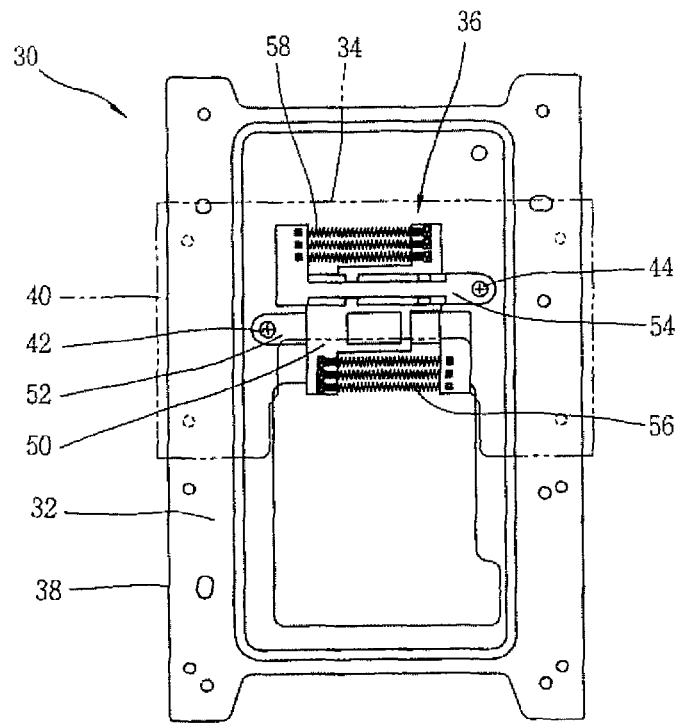
FIGS. 6 and 7 illustrate operation of the slide module in accordance with an embodiment of the present invention.
Figure 7:
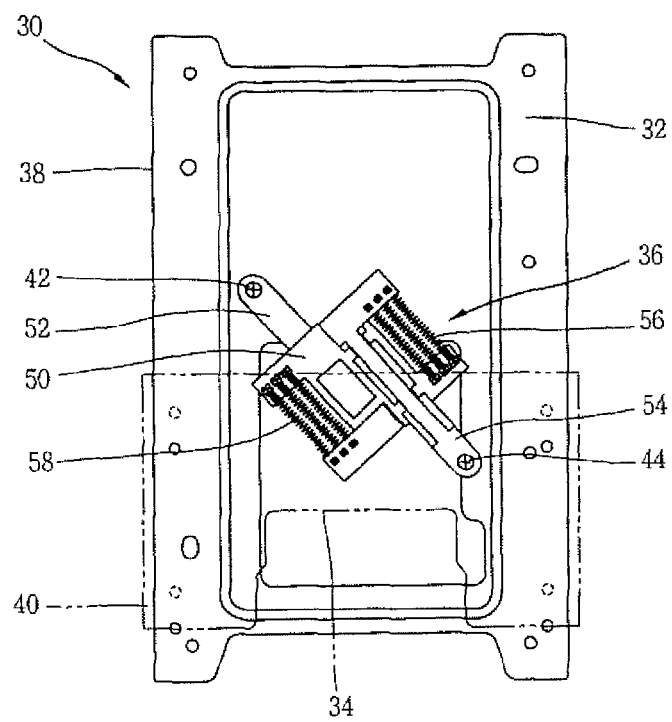

FIGS. 6 and 7 illustrate operation of the slide module 30 in accordance with an embodiment of the present invention.

As illustrated in FIG. 2, when the first slide member 32 is located at a lower side of the second slide member 34, the first body 10 may be closed with respect to the second body 20. In the closed state, the elastic force unit 36 may be disposed with the first rod 52 connected to a position inclined toward an edge of one side of the first slide member 32 by a hinge pin 42, and the second rod 54 connected to an edge of the other side of the second slide member 34 by hinge pin 44.

As described above, when the first body 10 is closed with respect to the second body 20, the elastic members 56 and 58 connected between the support member 50 and the first and second rods 52 and 54, respectively may be compressed so that no elastic force is generated.

When the first body 10 is slid in an opened direction, the first slide member 32 is slid upwardly. Then, as illustrated in FIG. 6, the first rod 52 and the second rod 54 may slide in opposite directions from the support member 50 and the first and second elastic members 56 and 58. In this state, the elastic members 56 and 58 are stressed, thereby generating an elastic force.

As the first slide member 32 is further slid upwardly and passes a dead point, the elastic force from the elastic members 56 and 58 is exerted onto the first rod 52 and the second rod 54, accordingly the first slide member 32 may automatically be slid in the opened direction.

Once the first slide member 32 is slid upwardly to a fully opened position, as illustrated in FIG. 7, the elastic force unit 36 may be positioned, such that the first body 10 maintains the opened state by the elastic force from the elastic members 56 and 58.

In the mobile terminal having the slide module in accordance with the present invention and having the configuration and operation as described above, the first rod 52 connected to the first slide member 32 by a hinge pin 42 and the second rod

54 connected to the second slide member 34 by a hinge pin 44 are slidably supported by the support member 50, respectively. The elastic members 56 and 58 are connected between the support member 50 and the first rod 52, and between the support member 50 and the second rod 54. Thus, the slide module is capable of enhancing durability and reliability of the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present inventive features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A slide module, comprising:
   a first slide member configured to slide upwardly and downwardly;
   a second slide member slidably mounted to the first slide member; and
   an elastic force unit disposed between the first slide member and the second slide member, and having at least one elastic member mounted between a first rod and a support member, and between a second rod and the support member,
   wherein the first and second rods are configured to slide in opposite directions, an elastic force being generated, when the first slide member is slid upwardly or downwardly with respect to the second slide member,
   wherein the first rod is slidably mounted at one side of the support member and has an end rotatably connected to the first slide member, and the second rod is slidably mounted at the other side of the support member and has an end rotatably connected to the second slide member, and
   wherein the support member comprises:
      a first rail groove portion for slidably supporting the first rod;
      a second rail groove portion disposed in parallel with the first rail groove portion and slidably supporting the second rod;
      a stopping jaw disposed on each end of the first rail groove portion and the second rail groove portion, the stopping jaw configured to prevent the corresponding first rod and second rod from separating from the support member; and
      a plurality of elastic member mounting portions configured to attach the at least one elastic member to the support member and each of the at least one elastic member disposed at a separate position along the sliding direction of the first and second rods.

2. The slide module of claim 1, wherein the first rail groove portion is provided at a front surface of the support member and the second rail groove portion is provided at a rear surface of the support member.

3. The slide module of claim 2,
   wherein the stopping jaw is inwardly protruded at the first rail groove portion and the second rail groove portion.

4. The slide module of claim 1, wherein the first rod and second rod each comprise a guide rail portion having a step formed at both edges, each guide rail portion configured to be slidably stopped by the stopping jaw on the corresponding first and second rail groove portion.

5. The slide module of claim 1, wherein the at least one elastic member comprises a first elastic member mounted between the first rod and the support member, and a second elastic member mounted between the second rod and the support member.

6. The slide module of claim 5, further comprising:
   a first elastic member mounting portion configured for fixing one end of the first elastic member to the support member; and
   a second elastic member mounting portion configured for fixing one end of the second elastic member to the support member.

7. The slide module of claim 1, wherein the at least one elastic member further comprises a plurality of tension coil springs.

8. The slide module of claim 7, wherein each of the plurality of elastic member mounting portions comprises a plurality of insertion recesses on the support member, wherein each of the plurality of tension coil springs attaches to the support member when both ends of the tension coil spring are inserted into the insertion recesses at a diameter reduction portion formed at both ends of the tension coil spring.

9. The slide module of claim 7, wherein each of the plurality of elastic member mounting portions comprises a plurality of connection pins protruding from the support member and configured for inserting coil spring connecting rings formed at both ends of each of the plurality of tension coil springs, such that both ends of the tension coil spring are rotatably supported.

10. The slide module of claim 1,
    wherein the first rod and the second rod are mounted at the support member such that no portion of the first rod and the second rod overlaps with each other or the first rod and the second rod do not face directly each other.

11. The slide module of claim 1, wherein the at least one elastic member allows the first slide member to be elastically biased when the first slide member is urged in an upward direction and a downward direction.

12. A mobile terminal, comprising:
    a first body having a display;
    a second body coupled with the first body;
    a slide module disposed between the first body and the second body;
    a first slide member configured to slide upwardly and downwardly, a second slide member slidably mounted to the first slide member; and
    an elastic force unit disposed between the first slide member and the second slide member,
    wherein the slide module is configured to generate elastically biased movement of the first body in an upward direction and a downward direction with respect to the second body, wherein the elastic force unit comprises:
a plurality of elastic members mounted between a first rod and a support member, and between a second rod and the support member,
wherein the first rod is slidably mounted at one side of the support member and has an end rotatably connected to the first slide member, and the second rod is slidably mounted at the other side of the support member and has an end rotatably connected to the second slide member,
wherein the first and second rods are configured to slide in opposite directions when the first slide member is slid upwardly or downwardly with respect to the second slide member, and
wherein the support member comprises:
a first rail groove portion for slidably supporting the first rod;
a second rail groove portion disposed in parallel with the first rail groove portion and slidably supporting the second rod;
a stopping jaw disposed on each end of the first rail groove portion and the second rail groove portion, the stopping jaw configured to prevent the corresponding first rod and second rod from separating from the support member; and
a plurality of elastic member mounting portions configured to attach the plurality of elastic members to the support member and each of the plurality of elastic members disposed at a separate position along the sliding direction of the first and second rods.

13. The mobile terminal of claim 12, wherein
the first rail groove portion is provided at a front surface of the support member and the second rail groove portion is provided at a rear surface of the support member.

14. The mobile terminal of claim 13, wherein the first rail groove portion is not formed on the first rod and the second rail groove portion is not formed on the second rod.

15. The mobile terminal of claim 12, wherein the stopping jaw is inwardly protruded at the first rail groove portion and the second rail groove portion.

16. The mobile terminal of claim 12, wherein the plurality of elastic members comprise a plurality of tension coil springs.

17. The mobile terminal of claim 16, wherein each of the plurality of elastic member mounting portions comprises a plurality of insertion recesses on the support member, wherein each of the plurality of tension coil springs attaches to the support member when both ends of the tension coil spring are inserted into the insertion recesses at a diameter reduction portion formed at both ends of the tension coil spring.

18. The mobile terminal of claim 12, wherein
wherein the first rod and the second rod are mounted at the support member such that no portion of the first rod and the second rod overlaps with each other or the first rod and the second rod do not face directly each other.

19. The mobile terminal of claim 12, wherein the first rod and second rod each comprise a guide rail portion having a step formed at both edges, each guide rail portion configured to be slidably stopped by the stopping jaw on the corresponding first and second rail groove portion.

20. The mobile terminal of claim 12, wherein each of the plurality of elastic member mounting portions comprises a plurality of connection pins protruding from the support member and configured for inserting coil spring connecting rings formed at both ends of each of the plurality of tension coil springs, such that both ends of the tension coil spring are rotatably supported.

21. The mobile terminal of claim 12, wherein when the first body is in a closed state with respect to the second body, the elastic force unit is disposed having the first rod connected to a position inclined toward an edge of one side of the first slide member, and the second rod connected to an edge of one side of the second slide member, thereby compressing the elastic members such that no elastic force is generated.

22. The mobile terminal of claim 12, wherein when the first body is in a closed state with respect to the second body and the first body is urged in an opened direction, the first slide member is slid upwardly to slide the first rod and the second rod in opposite directions thereby stressing the first and second elastic members and generating an elastic force to automatically slide the first body into an open state.

* * * * *